United States Patent
Nakatani

(10) Patent No.: US 8,093,936 B2
(45) Date of Patent: Jan. 10, 2012

(54) SEMICONDUCTOR DEVICE AND CONTROL METHOD THEREOF

(75) Inventor: Keigo Nakatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 12/560,221

(22) Filed: Sep. 15, 2009

(65) Prior Publication Data

US 2010/0066424 A1   Mar. 18, 2010

(30) Foreign Application Priority Data

Sep. 17, 2008  (JP) .................................. 2008-237338

(51) Int. Cl.
  *H03K 3/00*   (2006.01)
  *G06F 1/04*   (2006.01)
(52) U.S. Cl. ......... 327/291; 327/293; 327/295; 327/299
(58) Field of Classification Search .................. 327/165, 327/166, 291–299, 178, 374; 326/93–98; 716/6
See application file for complete search history.

(56) References Cited

U.S. PATENT DOCUMENTS

| | | | | |
|---|---|---|---|---|
| 6,150,865 A | * | 11/2000 | Fluxman et al. | 327/292 |
| 6,658,581 B1 | * | 12/2003 | Takahashi et al. | 713/401 |
| 7,489,176 B2 | * | 2/2009 | Kaviani et al. | 327/291 |
| 2002/0140487 A1 | * | 10/2002 | Fayneh et al. | 327/295 |
| 2008/0303576 A1 | * | 12/2008 | Chueh et al. | 327/299 |

FOREIGN PATENT DOCUMENTS

| | | |
|---|---|---|
| JP | 2001-043261 A | 2/2001 |
| JP | 2004-228504 A | 8/2004 |
| JP | 2005-010958 A | 1/2005 |
| JP | 2006-332897 A | 12/2006 |

* cited by examiner

*Primary Examiner* — Lincoln Donovan
*Assistant Examiner* — Brandon S Cole
(74) *Attorney, Agent, or Firm* — Fujitsu Patent Center

(57) ABSTRACT

According to an aspect of the embodiment, a skew detecting unit includes at least one over delay path or racing path for detecting skew. A clock adjusting unit sets a set value of delay based on the skew detected by the skew detecting unit. A clock cell adjusts delay in a first clock according to the set value of the delay, and outputs the result as a second clock.

4 Claims, 9 Drawing Sheets

SEMICONDUCTOR DEVICE AND CONTROL METHOD THEREOF

CROSS-REFERENCE TO RELATED APPLICATIONS

This application is based upon and claims the benefit of priority of the prior Japanese Patent Application No. 2008-237338, filed on Sep. 17, 2008, the entire contents of which are incorporated herein by reference.

FIELD

The embodiments discussed herein are related to a semiconductor device and a control method thereof.

BACKGROUND

In a chip of a semiconductor device (hereinafter referred to as an LSI), various clocks for operating respective circuits is supplied and distributed. However, because of physical variation in manufacturing of elements and wirings in the chip, there is shifts of propagation time, i.e., delay or advance (so called "clock skew") of each clock, and the clock skew occurs during the each clock reaches the respective circuits. In particular, in an LSI having a strict specification of timing of a clock such as a high operating frequency, it is necessary to adjust a clock skew for each chip after the manufacturing of the LSI. For this purpose, the LSI needs to have a clock skew adjusting circuit in order to supply adjusted clock to respective circuits.

In a scan test for an LSI based on the JTAG (Joint Test Action Group) standard of IEEE1149.1, there is known a method of performing timing adjustment for a clock signal in a delay setting circuit, which uses a delay value stored in a register belonging to a scan chain in which scan setting is possible.

In the scan test for the LSI, there is known a method of adjusting delay in a flip-flop circuit based on a delay value set in a memory in which scan setting is possible.

Further, there is known a clock adjusting device which can adjust, in an LSI including the clock adjusting device, a clock skew which differs in each LSI because of individual product variation and the like of the LSIs.

Furthermore, there is known a semiconductor device which can suppress an increase in a device size for a clock skew adjustment, and can prevent malfunction due to the clock skew, reduction in transfer efficiency due to the clock skew adjustment, and the like.

Patent Document 1: Japanese Laid-Open Patent Publication No. 2001-43261.
Patent Document 2: Japanese Laid-Open Patent Publication No. 2006-332897.
Patent Document 3: Japanese Laid-Open Patent Publication No. 2004-228504.
Patent Document 4: Japanese Laid-Open Patent Publication No. 2005-10958.

SUMMARY

According to an aspect of the embodiment, a semiconductor device includes a clock supplying unit, a clock distributing unit, a skew detecting unit, and a clock adjusting unit. The clock supplying unit supplies a first clock. The clock distributing unit is inputted a delay set value and the first clock, and outputs a second clock obtained by changing a phase of the inputted first clock based on the inputted delay set value. The skew detecting unit detects skew in an inside of the semiconductor device. The clock adjusting unit sets a set value of the delay based on the skew detected by the skew detecting unit.

According to the semiconductor device of the aspect of the embodiment, delay of a clock can be adjusted. Then, even when the delay of the clock changes, it is possible to adjust the change.

The object and advantages of the invention are realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, in the LSI provided with the clock skew adjusting circuit, there are a large number of places where delay of a clock is set. Thus, it is conceivable to calculate a set value of the delay of the clock using a genetic algorithm or the like. However, setting of the delay of the clock is usually performed only one time after the manufacturing of the LSI (at the time of shipment). After that, this set value continues to be used even after the shipment of an apparatus mounted with the LSI. Thus, when a clock skew further worsens than that of the time of manufacturing because of aged deterioration of the LSI, it is impossible to adjust the clock skew. When a margin of the clock skew is sufficiently secured in a product in advance, a ratio (manufacturing yield) is deteriorated at which products having performance requested in design can be manufactured. Thus, in actual, an operating frequency of a LSI for which the margin cannot be secured is set lower than the designed value, and the LSI is shipped as a product having lower performance than the designed performance.

As explained above, to adjust the delay of the clock, software for realizing the genetic algorithm or the like has to be prepared, which is troublesome. Further, as explained above, when a set value of the delay of the clock is set once after the manufacturing of the LSI, the set value is not changed after that. Thus, even when the delay of the clock changes because of aged deterioration in the LSI shipped to the market, it is impossible to adjust the change. Accordingly, for example, it would be convenient if the set value of the delay of the clock of the LSI could be adjusted, even when the LSI is built into a device or the like and is operating. In particular, it would be convenient if the delay of the clock could be adjusted according to a change in the delay of the clock.

A semiconductor device is provided and disclosed below which can adjust a clock skew due to variation in manufacturing and aged deterioration of the semiconductor device.

A control method for a semiconductor device is provided and disclosed below which can adjust a clock skew due to variation in manufacturing and aged deterioration of the semiconductor device.

According to the semiconductor device and the control method thereof, a set value of delay is set based on a skew detected by a critical path (over delay path) or a racing path. Thus, it is unnecessary to prepare software for realizing a genetic algorithm or the like. Further, delay of a clock can be adjusted according to a change in the delay of the clock. Thus, even when the delay of the clock changes because of aged deterioration in an LSI, it is possible to adjust the change.

Preferred embodiments of the present invention will be explained with reference to accompanying drawings.

Figure 1:
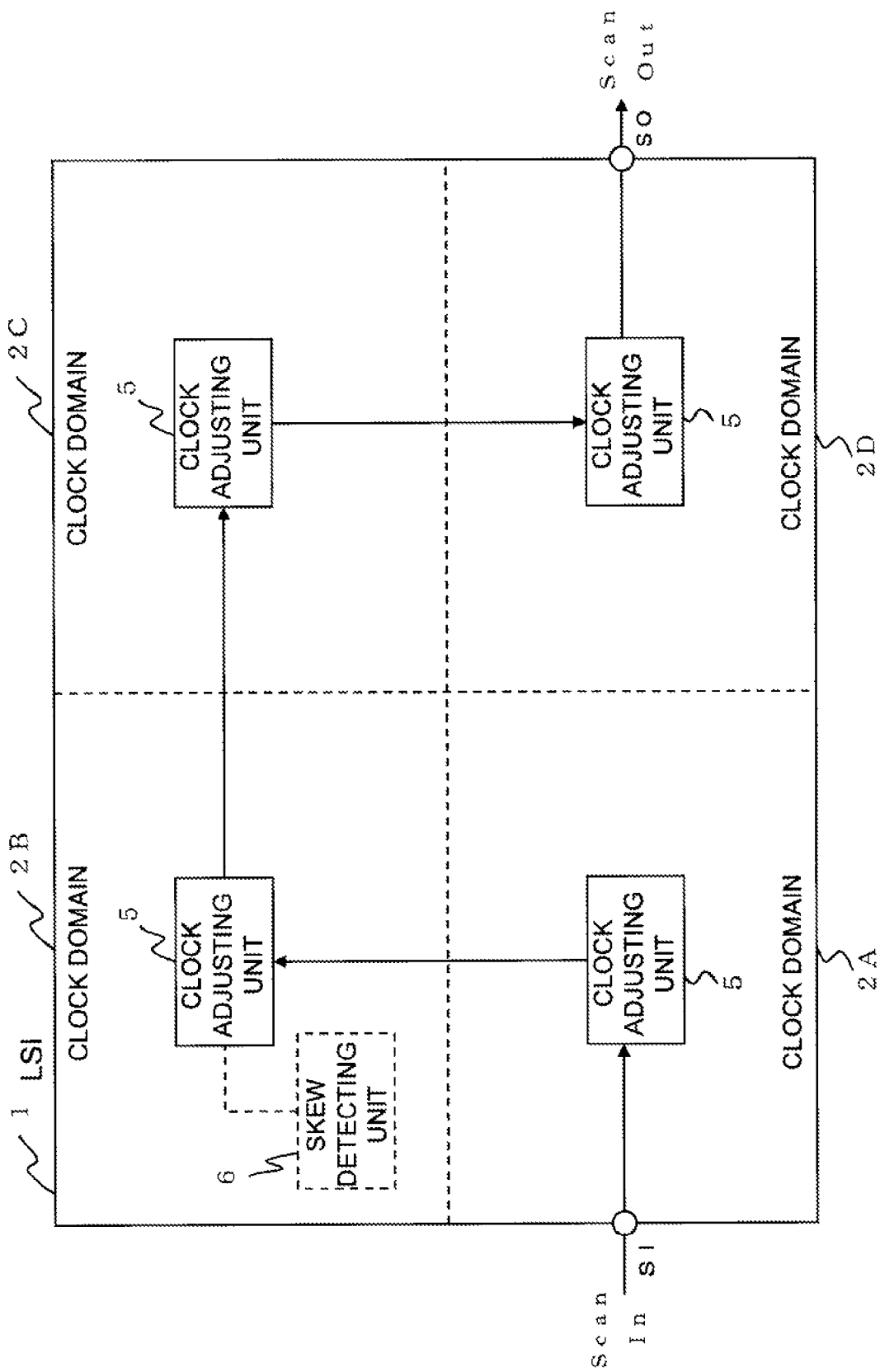
FIG. 1 is a diagram of a structure of a scan signal of a clock adjusting circuit.

FIG. 1 is a diagram of a semiconductor device including a clock adjusting circuit according to an embodiment, in particular, a structure of a clock adjusting unit.

A semiconductor device (hereinafter referred to as an LSI) 1 has, for example, a floor plan in which a semiconductor substrate is sectioned into four clock domains 2A to 2D. A clock adjusting unit 5 is provided in each of the clock domains 2A to 2D. In other words, a clock domain is an area in which one clock adjusting unit 5 is provided, or an area corresponding to one clock adjusting unit 5. Thus, in a case that a floor plan of a chip of the LSI 1 is divided into a plurality of clock domains 2, a clock adjusting unit 5 is provided in each of a plurality of clock domains 2.

The floor plan means an arrangement area on a semiconductor device. For example, in a multi-core processor having a plurality of processor cores and a shared cache memory shared by the plurality of processor cores, one processor core is arranged in one clock domain, and the shared cache memory shared by the processor cores is arranged in one clock domain.

The clock adjusting unit 5 adjusts delay (skew) of clock, which is distributed via a clock tree to circuits in the clock domain 2, to which the clock adjusting unit 5 belongs. The clock tree is explained later. Thus, a delay of the clock is adjusted independently for each of the four clock domains 2A to 2D. Different circuits or same circuits are respectively provided in the four clock domains 2A to 2D. As explained later, clocks with the delay adjusted are supplied to these circuits in the clock domains 2A to 2D.

For example, in a multi-core processor having the plurality of processor cores, processor cores having the same physical arrangement for the same logic circuit are arranged in respective clock domains in the same direction or, when necessary, arranged to be mirror-inverted.

Figure 2:
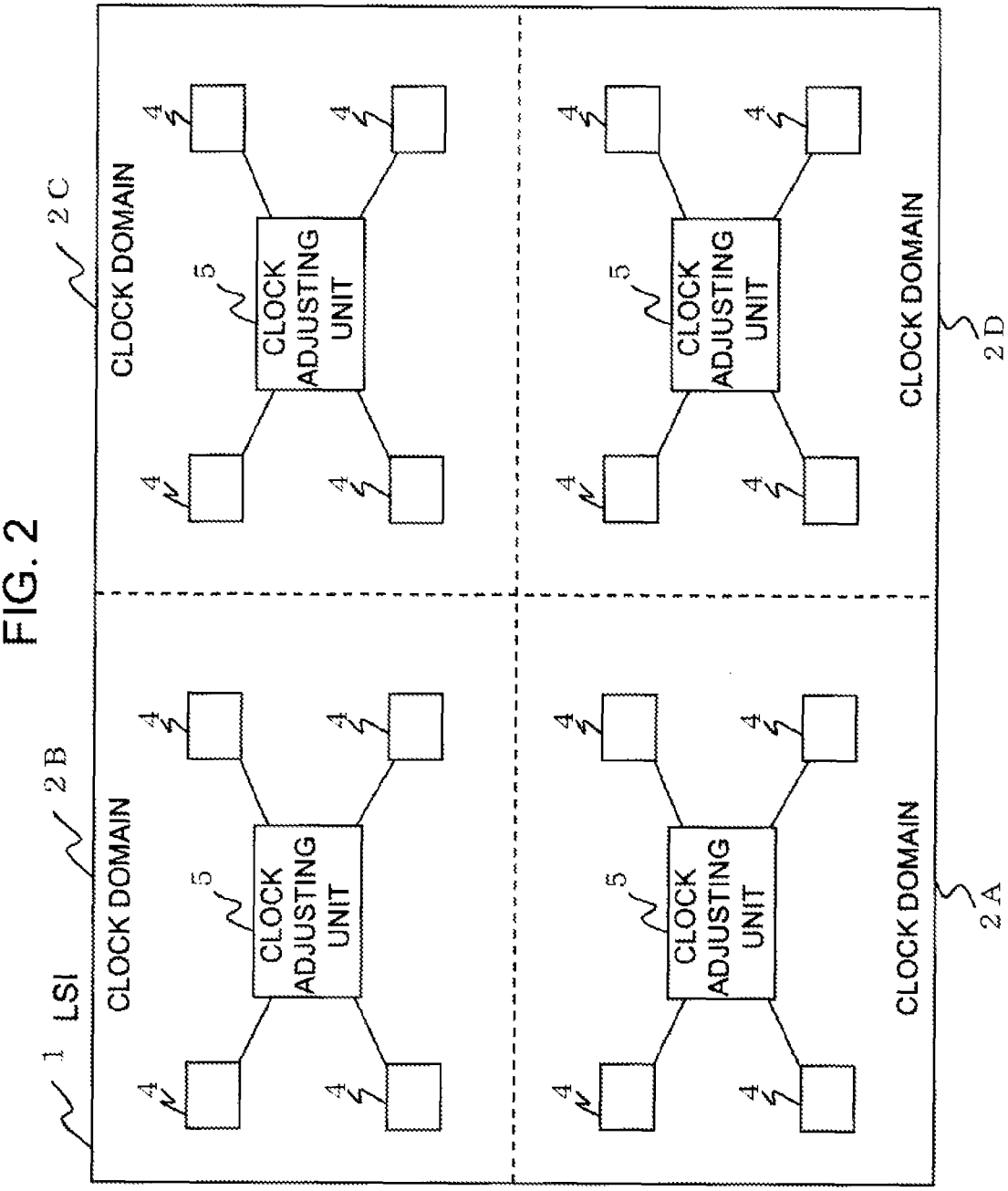
FIG. 2 is a diagram of a structure of delay setting for a system clock of the clock adjusting circuit.

The clock adjusting unit 5 sets a set value of delay of a clock, which is set based on a skew detected by the skew detecting unit 6, in clock cells 4, as illustrated in FIG. 2. To adjust skew among clock domains, the clock adjusting unit 5 includes the skew detecting unit 6. Thus, skew detecting units 6 are provided in the respective clock domains 2. In FIG. 1, the skew detecting unit 6 is extracted and illustrated only for the clock adjusting unit 5 of the clock domain 2B.

The number of clock domains 2A to 2D is not limited to four, and may be one or other numbers. A shape of the clock domains 2A to 2D is not limited to a square or a rectangle, and may be other shapes.

The four clock adjusting units 5 are connected in series to form a chain circuit (a scan chain) for setting or for scanning-in a predetermined signal from the outside of the LSI 1 based on the JTAG standard or the like specified in IEEE1149.1, for example. The predetermined signal, which is a scan-in signal ScanIn, is a signal for inputting an initial set value of a set value of delay. The chain circuit is connected between a scan input terminal SI (ScanIn) of the LSI 1, and a scan output terminal SO (ScanOut) of the LSI 1. That is, the input terminal SI of the LSI 1 is connected to the clock adjusting unit 5 of the clock domain 2A, which is a head clock domain of the chain. The four clock adjusting units 5 are chain-connected in order of the clock domains 2A to 2D. The scan output terminal SO of the LSI 1 is connected to the clock adjusting unit 5 of the clock domain 2D, which is the a clock domain of the chain.

For example, when delay adjustment of a clock is performed during LSI manufacturing, a test target LSI 1 is mounted on an LSI tester or the like, and the scan signal ScanIn as a serial signal is inputted to the clock adjusting unit 5 of the clock domain 2A via the scan input terminal SI of the LSI 1. The scan signal ScanIn is inputted to the clock adjusting unit 5 of the clock domain 2B in the next stage as an output of the clock domain 2A. Then, the scan signal ScanIn is propagated to the clock adjusting unit 5 of the clock domain 2C and the clock adjusting unit 5 of the clock domain 2D in order. A bit position of the clock adjusting units 5 in a bit length of the entire scan chain is known in advance. Thus, an initial value of a set value of delay of the clock adjusting units 5 can be set by inputting the predetermined signal.

FIG. 2 is a diagram of a structure of delay setting for a clock in the clock adjusting circuit according to this embodiment. The structure of the delay setting for a clock can be applied to distribution of not only a system clock which is used during system operation of an LSI but also various kinds of clock supplied into the LSI.

The clock adjusting unit 5 sets the set value of the delay, which is obtained after the adjustment, in the clock cells 4 corresponding the clock adjusting unit 5. A plurality of (in this example, four) clock cells 4 are provided in the clock domains 2, in other words, one clock cell 4 corresponds to one clock adjusting unit 5. Thus, the set value of the delay from the clock adjusting unit 5 is set in the four clock cells 4 corresponding thereto. In other words, a common set value is set for a plurality of clock cells 4 belonging to the same clock domain 2.

Figure 3:
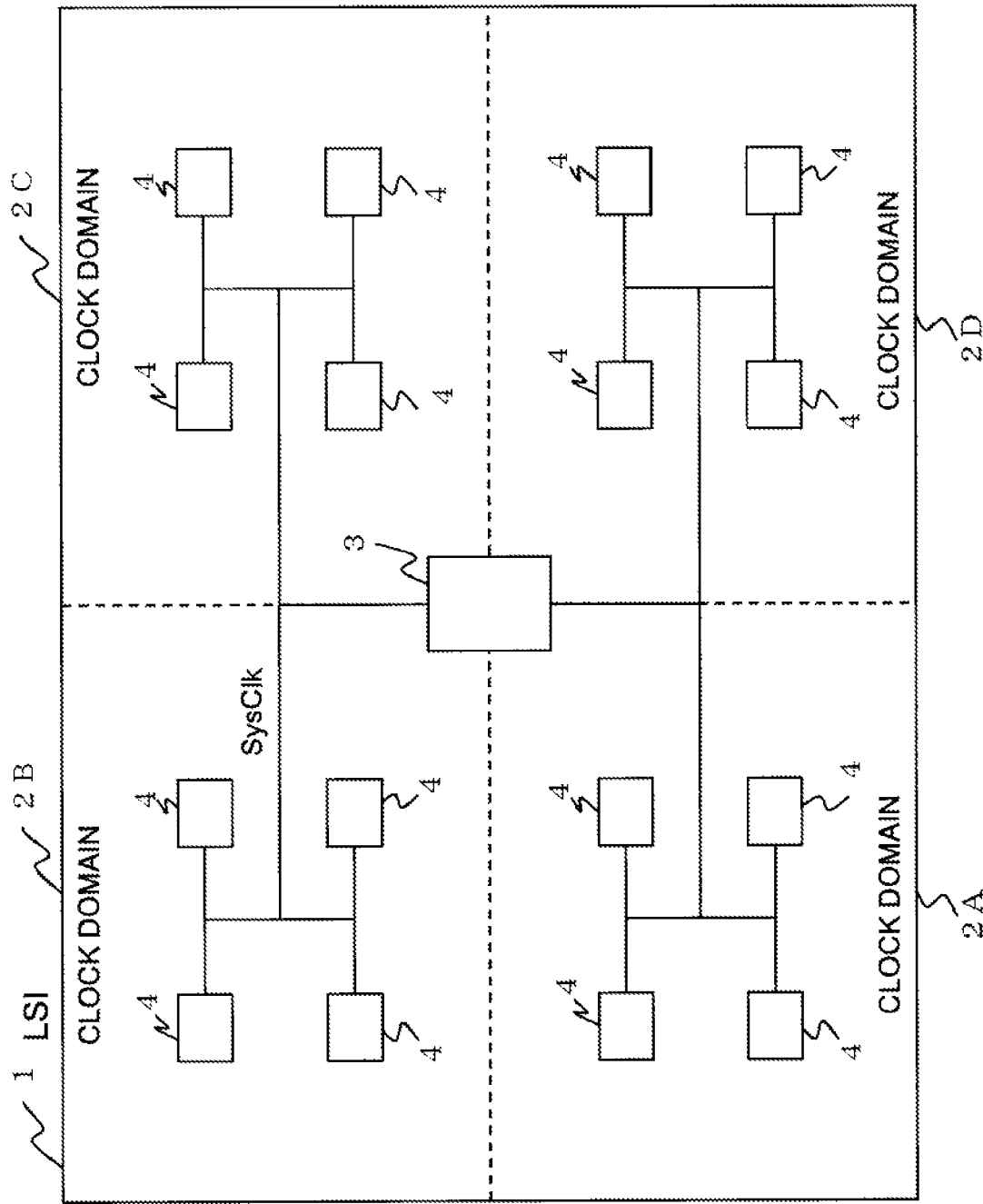
FIG. 3 is a diagram of a structure of the system clock of the clock adjusting circuit.

FIG. 3 is a diagram of the supply of system clock in the clock adjusting circuit, using a so-called H tree, according to this embodiment.

The LSI 1 includes one clock supplying unit 3, which is arranged in center or near the center of the floor plan of the entire LSI 1, and the plurality of clock cells 4. The clock supplying unit 3 includes a PLL (Phase Locked Loop). The clock supplying unit 3 generates a system clock SysClk, and supplies the system clock SysClk to the respective clock cells 4 in the respective clock domains 2 via the H tree. The H tree is a branch tree of an H shape, and has a hierarchical structure. The clock cells 4 adjusts a clock skew of the system clock SysClk according to the set value of the clock adjusting unit 5, to set a delay. That is, the clock cells 4 adjust the delay in the system clock SysClk according to the set value of delay, and output clocks SysClk' after the adjustment. A first clock is the system clock SysClk which is outputted by the clock supplying unit 3. Second clocks are the clocks SysClk' after the adjustment which is supplied by the respective clock cells 4. Consequently, the clock cells 4 supply the second clocks SysClk' to circuits provided in the clock domains 2 to which the clock cells 4 belong.

An external clock supplied from a PLL, a crystal oscillator, or the like on the outside of the LSI 1 may be used as the first clock instead of the system clock SysClk. An external clock supplied from an LSI tester on the outside of the LSI 1 may be used as the first clock only when adjustment processing for delay is performed.

Figure 4:
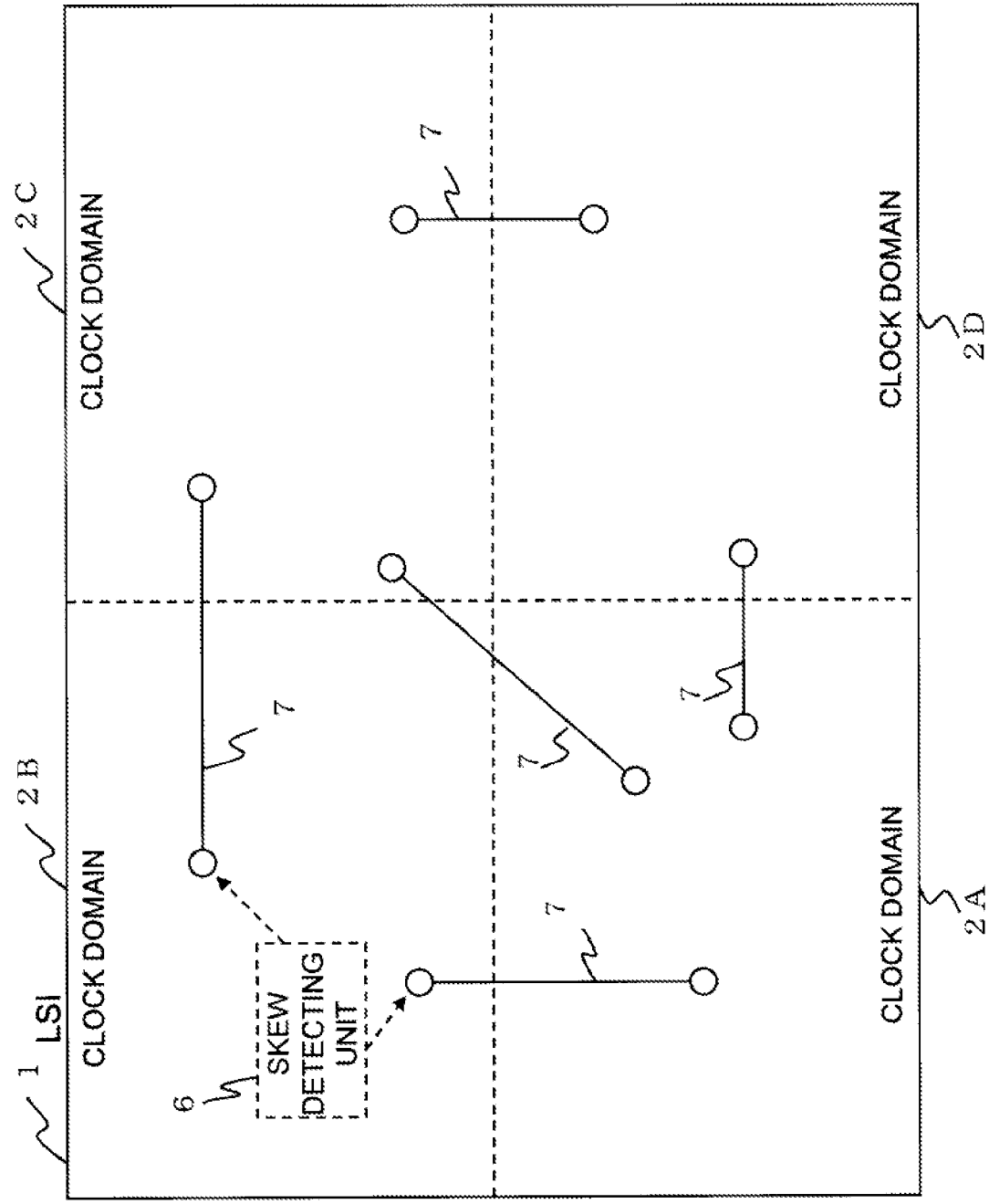
FIG. 4 is a diagram of a structure of a path of the clock adjusting circuit.

FIG. 4 is a diagram of a structure of a path I other words, a signal propagation path, as a clock adjustment target of the clock adjusting circuit according to this embodiment.

As explained above, the skew detecting units 6 are provided in the respective clock domains 2. Each of the skew detecting units 6 includes at least one or a plurality of critical paths (over delay paths) or racing paths for detecting the skew of the clock. The critical path is a path for detecting delay-over of the clock, and is a path in which delay-over is highly likely to occur. The racing path is a path for detecting racing of the clock, and is a path in which racing is highly to likely occur.

For example, the skew detecting unit 6 of the clock domain 2B includes a critical path (over delay path) or a racing path. In the critical path or a racing path, one of an input unit and an output unit is provided in the clock domain 2B to which the skew detecting unit 6 belongs, and the other of the input unit and the output unit is provided in the clock domain 2A or 2C to which the skew detecting unit 6 does not belong. The input unit and the output unit are indicated by white circles in FIG. 4.

Paths 7 are pseudo-critical paths (over delay paths) or pseudo-racing paths, for example, both of which are formed to physically simulate. The paths 7 include input units or sending latches which transmit signals, and output units or receiving latches which receive signals. For example, the pseudo-critical paths are paths having the same structure with or similar structure to the critical path which forms the circuit of the LSI 1. The critical path which forms the circuit of the LSI 1 may be used as the paths 7. The same applies to the pseudo-racing paths.

Actually, it is possible to learn in advance a possibility of delay or racing between different clock domains 2 according to timing simulation employing a model, which reflects logical circuit information, and arrangement and wiring information of the logical circuit in design. That is, when there is variation of a clock skew, it is possible to learn in advance whether the critical path (over delay path) is over-delayed or the racing path is raced. Thus, for example, the critical paths are set between the different clock domains 2 at which possibility of delay is high, based on the design.

Both of the critical paths and the racing paths may be provided as the paths 7 between the different clock domains 2. Both of the critical paths and the racing paths may be set among all the clock domains 2.

Figure 5:
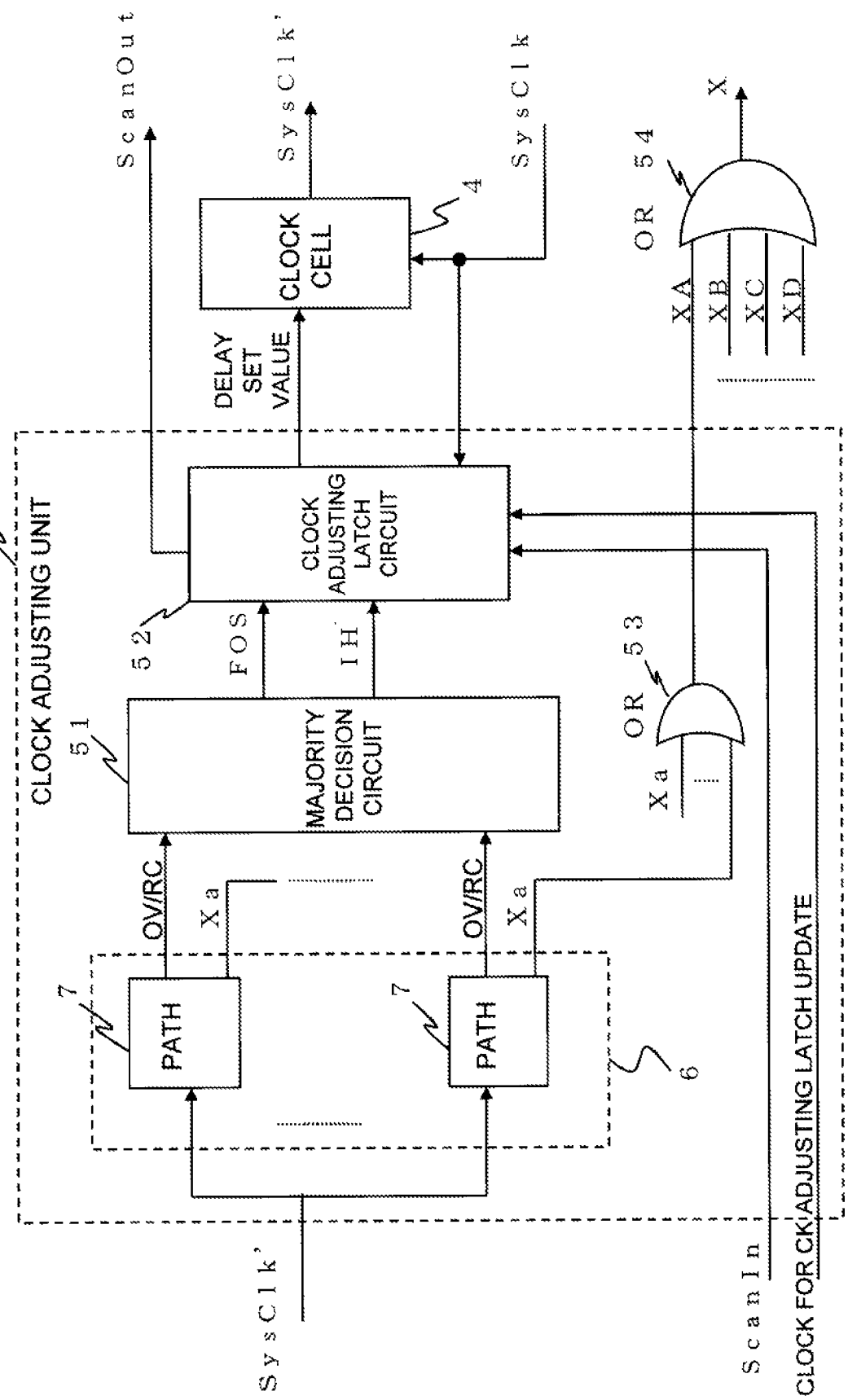
FIG. 5 is a diagram of a structure of the clock adjusting circuit.

FIG. 5 is a diagram of a structure of the clock adjusting circuit according to this embodiment.

The clock adjusting unit 5 includes the paths 7, a decision by majority circuit 51, a clock adjusting latch circuit 52, and an OR circuit (an OR operation circuit) 53. An output of the OR circuit 53, which is a fail signal X, is inputted to an OR circuit 54. The OR circuit 54 calculates a logical sum of the fail signals of the clock adjusting units 5 of the respective clock domains 2. One OR circuit 54 is provided in common to all the (four) clock domains 2.

The paths 7 receive the clocks SysClk' supplied from the clock cells 4 as their inputs, and output OV (Over delay) or RC (Racing) signals and signals Xa. The OV/RC signals indicate states of the paths 7, and are inputted to the decision by majority circuit 51. The signal Xa is inputted to the OR circuit 53.

When the paths 7 are critical paths, (over delay paths) and are over-delayed by applying the clock SysClk', the OV/RC signal becomes an OV signal, which is an over-delay detection signal. When the paths 7 are racing paths and are raced by applying the clock SysClk', the OV/RC signal becomes an RC signal, which is a racing detection signal.

The fail signals Xa outputted by the paths 7 becomes "1", when the paths 7 are over-delayed or raced. Otherwise, the fail signals Xa becomes "0", as explained later with reference to FIG. 6. With regard to the paths 7 related to the clock domain 2A, for example, an output XA is obtained by calculating a logical sum of all their fail signals Xa in the OR circuit 53.

Similarly, related to the clock domains 2B, 2C, and 2D, signals XB, XC, and XD are obtained which are results of OR operation by OR circuits of the respective clock domains. A logical sum of the fail signals XA, XB, XC, and XD of all the clock domains 2A to 2D is obtained as an output X by the OR circuit 54. The logical sum X of the fail signals is a signal for determining whether clock adjustment is appropriately performed in the entire LSI 1, when a plurality of delay of the clocks are adjusted among the plurality of clock domains 2 of the LSI 1.

Figure 6:
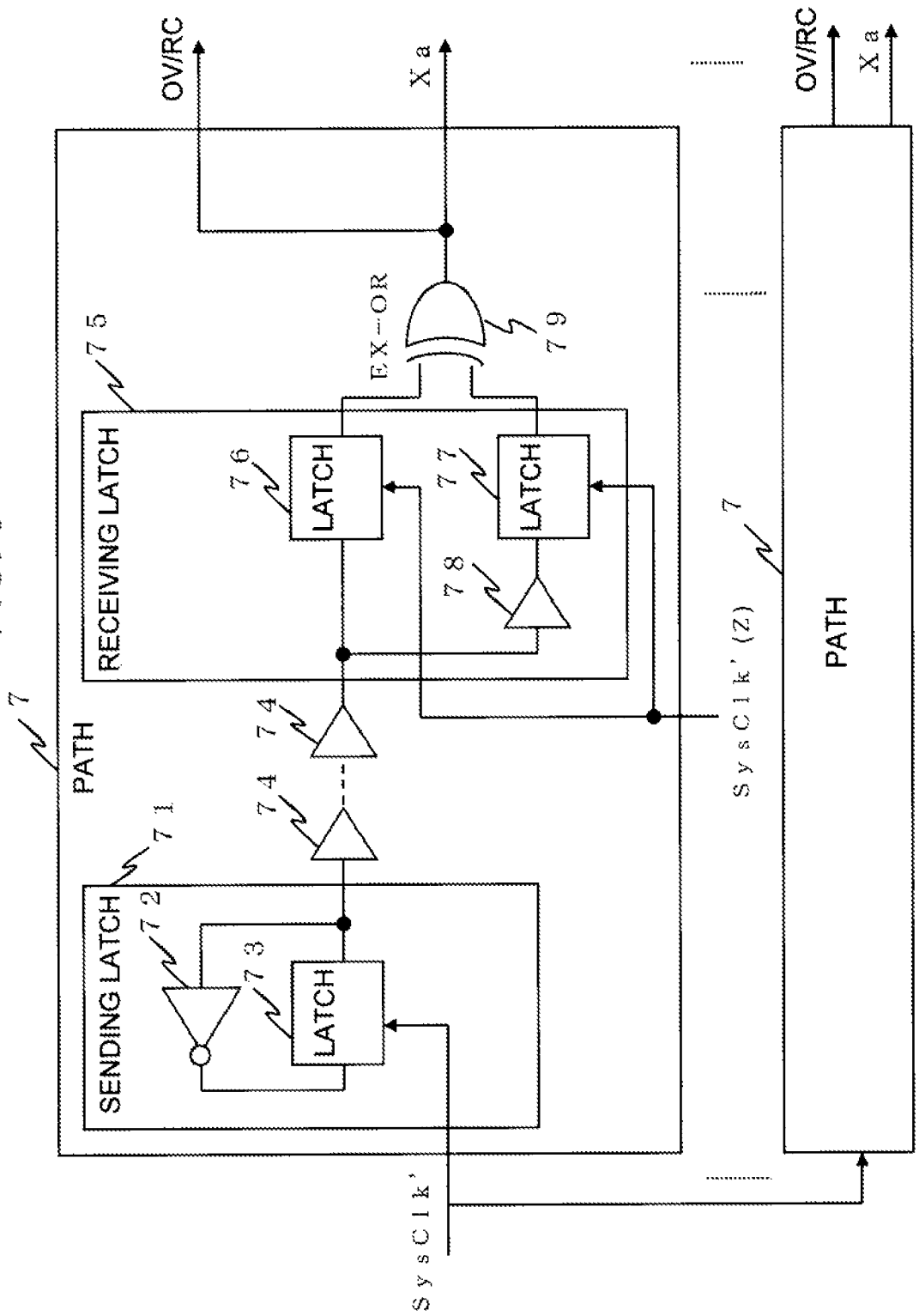
FIG. 6 is a diagram of a structure of the path.

FIG. 6 is a diagram of a structure of the path 7 according to this embodiment.

The path 7 includes a sending latch 71, a plurality of buffers 74, a receiving latch 75, and an EX-OR circuit (Exclusive-OR circuit) 79. The plurality of buffers 74 are provided between the sending latch 71 and the receiving latch 75, and cause a skew of a signal.

The sending latch 71 is a signal transmitting circuit which transmits a stored signal, and includes an inverter 72 and a latch 73. The sending latch 71 transmits a predetermined signal (or a predetermined clock) to the receiving latch 75 via the plurality of buffers 74. The receiving latch 75 is a signal receiving circuit, and includes a latch 76, a latch 77, and a buffer 78. The receiving latch 75 receives and stores the predetermined signal transmitted via the plurality of buffers 74.

The sending latch 71 outputs a sending signal using a clock SysClk' of the clock domain 2, to which the sending latch 71 belongs, as a base clock. The receiving latch 75 receives the sending signal transmitted by the sending latch 71 using a clock SysClk'(Z) of the clock domain 2, to which the receiving latch 75 belongs, in other words, other than the clock domain 2 to which the sending latch 71 belongs, as a base clock. The latch 73 in the sending latch 71 of the path 7 operates with the clock SysClk' as input.

Output of the latch 73 is connected to input of the latch 73 via the inverter 72 which inverts and outputs its input signal. Thus, a signal level of the output of the latch 73 is inverted every cycle of the clock SysClk'.

When the sending signal of the sending latch 71 is transferred to the receiving latch 75, the receiving latch 75 receives the sending signal using the clock SysClk'(Z) as a base clock. In this case, a transfer time from the sending latch 71 to the latch 77 in the receiving latch 75 is longer than a transfer time to the latch 76, because one buffer 78 is additionally interposed. The clock adjusting circuit 5 detects the over-delay state or racing state of the path 7 using this difference in the transfer time.

For example, in a case that the path 7 is a critical path (over delay path) and values of outputs of the two latches 76 and 77 in the receiving latch 75 are different, the latch 77 is over-delayed. In a case that the path 7 is a racing path and the values of the outputs of the two latches 76 and 77 in the receiving latch 75 are different, the latch 76 is raced. On the other hand, in a case that the values of the outputs of the latches 76 and 77 are the same, the path 7 is in a normal operation state.

By calculating an exclusive logical sum of the outputs of the latches 76 and 77 in the EX-OR circuit 79, the EX-OR circuit 79 outputs a signal Xa=1 when values of outputs of the latches 76 and 77 are different. On the other hand, when the values of the outputs of the latches 76 and 77 are the same, the EX-OR circuit 79 outputs a signal Xa=0 as a result of the exclusive OR operation. This makes it possible to detect an over-delay or racing state of the path 7.

Referring back to FIG. 5, the decision by majority circuit 51 determines whether a phase of the clock SysClk' is advanced or delayed based on processing explained below. The decision by majority circuit 51 determines whether each of the OV/RC signals outputted from the respective paths 7 are the OV signal or the RC signal based on the type (critical path (over delay path) or racing path) of the respective paths 7. The decision by majority circuit 51 decides by majority on a plurality of signals indicating that the clock SysClk' of the clock domain 2 is advanced or delayed, or on a plurality of OV signals, a plurality of RC signals, both of which are determined as explained above, and directions of transfer of the respective paths 7, and then determines whether the clock SysClk' of the clock domain 2 is advanced or delayed.

Figure 7:
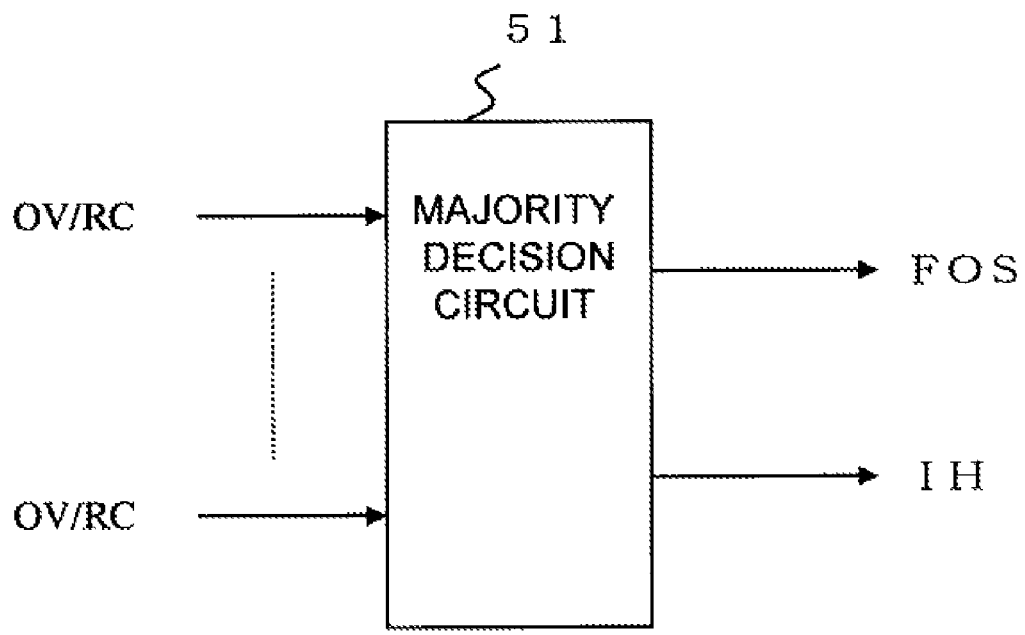
FIG. 7A is a diagram of connection of input and output signals of a decision by majority circuit.
FIG. 7B is a diagram of an operation truth table of an up-down counter.
Figure 8:
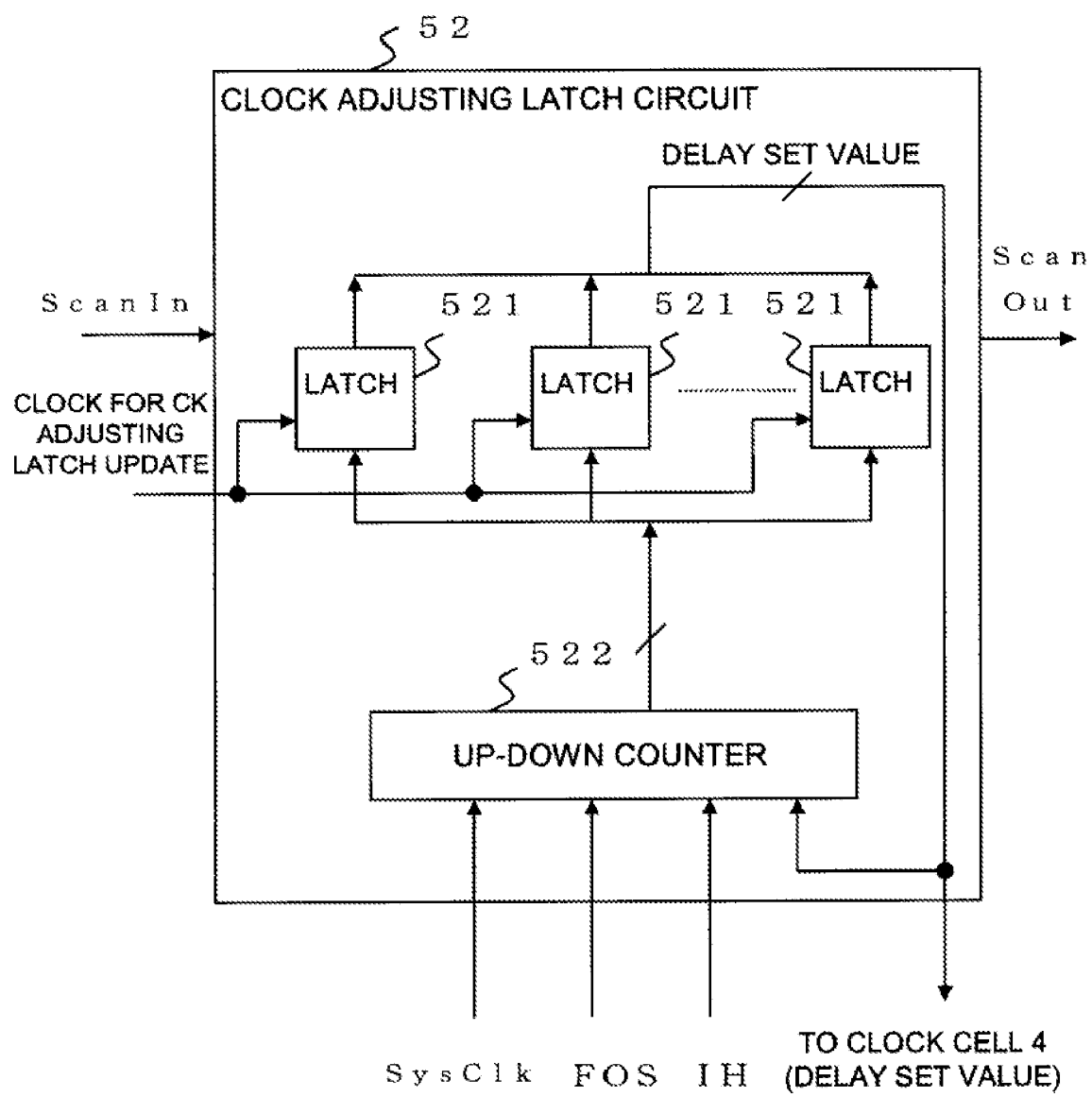
FIG. 8 is a diagram of a structure of a clock adjusting latch circuit.

FIG. 7B is a diagram of an operation truth table 51A of an up-down counter 522, which is provided in the clock adjusting latch circuit 52 illustrated in FIG. 8. The operation truth table 51A illustrates logics of a signal FOS and a signal IH, both of which are outputted by the decision by majority circuit 51.

When the signal IH is "1", and the signal FOS is "1" or "0", a set of the signal IH and the signal FOS is a set of request signals which does not change the delay setting of the clock SysClk' with respect to the clock adjusting latch circuit 52. The clock adjusting latch circuit 52 does not change the delay setting of the clock SysClk'. In this case, the up-down counter 522 maintains count operation.

When the signal IH is "0" and the signal FOS is "1", a set of the signal IH and the signal FOS is a set of request signals which advances the clock SysClk' with respect to the clock adjusting latch circuit 52. In this case, the up-down counter 522 changes the count operation to up-count.

When the signal IH is "0" and the signal FOS is "0", a set of the signal IH and the signal FOS is a set of request signals which delays the clock SysClk' with respect to the clock adjusting latch circuit 52. In this case, the up-down counter 522 changes the count operation to down-count.

Consequently, the decision by majority circuit 51 can instruct a change of the set value of the delay of the clock adjusting latch circuit 52 based on the OV/RC signals of the paths 7.

Referring back to FIG. 5, the decision by majority circuit 51 outputs the signal FOS=1 for advancing the phase of the clock SysClk' of the clock domain 2, the signal FOS=0 for delaying the phase, or the signal IH=1 for not changing the phase, based on the determination described above, to the clock adjusting latch circuit 52. The signal IH=1 is outputted in a case that the number of signals for advancing the phase and the number of signals for delaying the phase are the same.

FIG. 7A is a diagram of connection of input and output signals of the decision by majority circuit according to this embodiment. In FIG. 7A, the decision by majority circuit 51 is provided in the clock adjusting unit 5 of each of the clock domains 2.

The decision by majority circuit 51 receives the plurality of OV/RC signals outputted from the respective paths 7 as inputs, and determines whether the OV/RC signals are OV signals or RC signals based on setting of the paths at the time of designing. Further, the decision by majority circuit 51 determines whether the OV/RC signals correspond to a signal for advancing the clock SysClk' or a signal for delaying the clock SysClk'.

The decision by majority circuit 51 determines the corresponding signals as the signals for advancing the clock SysClk' of the clock domain 2 and signals for delaying the clock SysClk' of the clock domain 2, and decides by majority whether the clock SysClk' is advanced or delayed. The decision by majority circuit 51 outputs to the clock adjusting latch circuit 52 the signal FOS=1 when the clock is advanced, the signal FOS=0 when the clock is delayed, or the signal IH=1 when the clock is not changed.

For example, specifically, it is supposed that the sending latch is in the clock domain 2A, the receiving latch is in the clock domain 2B, and the path 7 is the pseudo-critical path (over delay path). The decision by majority circuit 51 applies the clock SysClk' thereto, and then, when the sending latch, the receiving latch, and the path 7 are in an over-delay state, the decision by majority circuit 51 detects the signal OV. In this case, the decision by majority circuit 51 of the clock domain 2A inputs the detected signal OV for decision by majority as a signal to advance the phase of the clock SysClk' of the clock domain 2A.

Instead, in this case, the decision by majority circuit 51 of the clock domain 2B, to which the receiving latch belongs, may input the signal OV for decision by majority as a signal to delay the phase of the clock SysClk' of the clock domain 2B. That is, the decision by majority circuits 51 of the respective clock domains 2 have to use, for decision by majority, at least signals for advancing or delaying the phase of the clock SysClk' of any one of the clock domains 2A and 2B.

Referring back to FIG. 5, the clock adjusting latch circuit 52 selects based on the signal FOS and the signal IH whether the set value of the delay of the clock SysClk is increased, reduced, or not changed. The clock adjusting latch circuit 52 updates the set value of the delay based on a clock for updating a CK adjusting latch. As explained above, the clock cell 4 supplies the clock SysClk' obtained by changing a phase of the clock SysClk, which is obtained by delaying the clock SysClk according to the set value of the delay set by the clock adjusting latch circuit 52.

As the fail signal Xa output from the paths 7, "1" is outputted in the case of over-delay or racing. When the delay adjustment for the clock SysClk' of the clock adjusting latch circuit 52 is not sufficient, the fail signal Xa=1 is generated from any one of the paths 7, and, as a result, the signal X becomes "1".

As explained above, the clock adjusting circuit can adjust a path state after the adjustment of delay of the clock by monitoring the signal X of the fail signal. Thus, the clock adjusting circuit can adjust the delay of the clock so as to make the signal X="0", and, by the adjustment of the delay, can adjust the clock skew arranging phases of the clocks among the areas of the clock domains 2.

In addition, the clock adjusting circuit can monitor a change in the delay of the clock during the operation of the LSI. Thus, it is possible to adjust the delay of the clock according to the change in the delay of the clock.

FIG. 8 is a diagram of a structure of the clock adjusting latch circuit according to this embodiment.

The clock adjusting latch circuit 52 includes a plurality of latches 521, and an up-down counter 522.

The plurality of latches 521 store the set values of the delay of the clock of the clock cells 4 in a form of a plurality of bit information. When the clock for updating the CK adjusting latch is inputted, the latches 521 read a count value of the up-down counter 522, and update data of the latches 521.

The up-down counter 522 performs processing for increasing or reducing the set values of the delay, according to the count value. In this case, as explained above with reference to FIG. 7B, the up-down counter 522 performs counter operation, which uses the clock SysClk, based on the operation truth table 51A illustrated in FIG. 7B according to the inputted signals of the signal FOS and the signal IH. For example, when the signal FOS is "1" and the signal IH is "0", the up-down counter 522 increases the set values of the delay by one count from the present count value. On the other hand, when the signal FOS is "0" and the signal IH is "0", the up-down counter 522 decreases the set values of the delay by one count from the present count value.

When the clock for updating the CK adjusting latch is inputted to the latches 521, the latches 521 read the count value of the up-down counter 522. As a result, outputs of the latches 521 are updated, and then the set values of the delay of the clock adjusting latch circuit 52 are updated.

Consequently, the clock cells 4 set delays for the clocks SysClk based on the updated set values of the delay, and supply the clocks SysClk' obtained by changing the phase as a delayed clock to the respective circuits in the clock domains 2.

Figure 9:
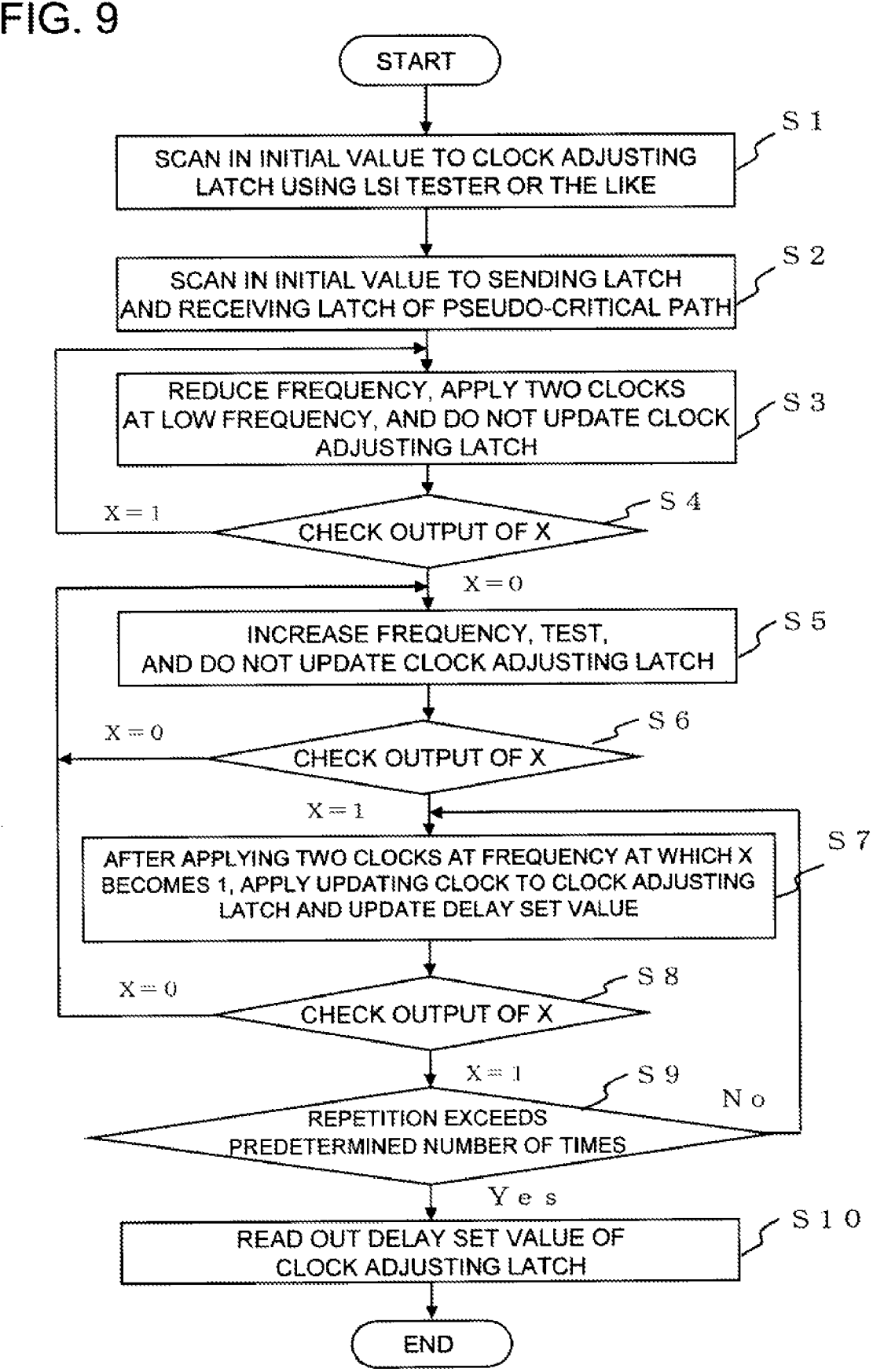
FIG. 9 is a flowchart of a clock adjustment processing flow.

FIG. 9 is a flowchart of a processing flow of clock adjustment processing in the clock adjusting circuit according to this embodiment.

After the manufacturing of the LSI, in order to adjust the clock adjusting circuit, an initial value is scanned into the clock adjusting latch circuit 52 by an LSI tester or the like to initialize a set value of delay (step Si).

Then, the initial value is scanned into the sending latch 71 and the receiving latch 75 of the critical paths (over delay paths) or the like of the paths 7 of the LSI 1 for the initialization (step S2).

In an initial period of an adjustment process of the LSI 1, two clocks SysClk, which has a frequency lower than a design target frequency, are applied by the LSI tester. However, the clock for updating the CK adjusting latch is not applied to the clock adjusting latch circuit 52 (step S3).

The clock adjusting latch circuit 52 performs processing for searching for a sufficiently low frequency, at which the fail signal X becomes "0", with the LSI tester or the like, while keeping the set value of the delay of the clock at the initial value. For this purpose, when the signal X is "0", the clock adjusting latch circuit 52 shifts to processing of the step S5, and, when the signal X is "1", the clock adjusting latch circuit 52 returns to the processing of the step S3 (step S4).

When the signal X is "0", a test frequency of the LSI tester or the like is increased a little to check a value of the fail signal X, In this case, as in the above case, the clock for updating a CK adjusting latch is not applied to the clock adjusting latch circuit 52 (step S5). When the signal X is "0" after the increasing of test frequency, the clock adjusting latch circuit 52 returns to the processing of the step S5, and, when the signal X is "1", the clock adjusting latch circuit 52 shifts to processing of the step S7 (step S6).

When the signal X is "1", two clocks SysClk are applied which has a frequency at which the signal X becomes "1". Then, the clock for updating the CK adjusting latch is applied to update the set value of the delay of the clock of the clock adjusting latch circuit 52 (step S7). Subsequently, the signal X is monitored. When the signal X is "0", the clock adjusting latch circuit 52 returns to the processing of the step S5, and, when the signal X is "1", the clock adjusting latch circuit 52 shifts to processing of the step S9 (step S8).

When the signal X is "1" and the repetition number of the processing in the steps S7 to S9 does not exceed a predetermined number of times, the clock adjusting latch circuit 52 returns the processing to the step S7 repeatedly. On the other hand, when the repetition number exceeds the predetermined number of times, the clock adjusting latch circuit 52 shifts the processing to the step S10 (step S9).

When the repetition number exceeds the predetermined number of times, since the signal X does not become "0", the set value of the clock adjusting latch circuit 52 is read out, and the set values of the delay in the clock cells 4 is updated by the read out value (step S10).

According to the processing described above, the adjustment of the clock adjusting circuit is finished after the manufacturing of the LSI. The LSI 1 can use at the test frequency of the clock which is set by the processing described above as an upper limit frequency.

A clock delay adjusting method of the clock adjusting circuit may be realized during operation of an LSI as follow. That is, in the flowchart of FIG. 9, the test frequency is fixed, and clock delay adjustment performs such that the signal X becomes "0". In this case, a CPU or the like other than the LSI may monitor the signal X, and perform control instruction.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present inventions have been described in detail, it should be understood that the various changes, substitutions, and alterations could be made hereto without departing from the sprit and scope of the invention.

What is claimed is:

1. A semiconductor device comprising:
    a substrate of the semiconductor device divided into a plurality of area each of which is provided with a clock adjusting unit, a skew detecting unit, and a clock distributing unit;
    a clock supplying unit supplying a first clock;
    a clock distributing unit being inputted a delay set value and the first clock, outputting a second clock obtained by changing a phase of the inputted first clock based on the inputted delay set value, and supplying the second clock to circuits provided in an area to which the clock distributing unit belongs;
    a skew detecting unit detecting at least one over delay path or racing path, one of an input unit and an output unit of the over delay path or racing path is provided in an area to which the skew detecting unit belongs, and the other of the input unit and the output unit of the over delay path or racing path is provided in an area to which the skew detecting unit does not belong, and detecting skew in the over delay path or racing path; and
    a clock adjusting unit setting a value of delay based on the skew detected by the skew detecting unit.

2. The semiconductor device according to claim 1,
    wherein the skew detecting unit detects a plurality of over delay paths or racing paths in the semiconductor device, and
    wherein the clock adjusting unit further comprises a decision by majority circuit which sets an increase or decrease of the set value of the delay based on decision by majority of skew detected on the plurality of over delay paths or racing paths.

3. The semiconductor device according to claim 1, wherein the clock adjusting units provided in the plurality of areas are connected to form a chain circuit for setting an initial value of the set value of the delay, and the chain circuit is connected between an input terminal and an output terminal of the semiconductor device.

4. A control method for a semiconductor device operating according to supply of clock to an inside thereof, the control method comprising:

providing a substrate of the semiconductor device divided into a plurality of area each of which is provided with a clock adjusting unit, a skew detecting unit, and a clock distributing unit;

supplying a first clock form the clock supplying unit;

inputting a delay set value and the first clock to the clock distributing unit, and outputting a second clock obtained by changing a phase of the input first clock based on the delay set value from the clock distributing unit;

supplying the second clock from the clock distributing unit to circuits provided in an area to which the clock distributing unit belongs;

detecting in the skew detecting unit at least one over delay path or racing path, one of an input unit and an output unit of the over delay path or racing path is provided in an area to which the skew detecting unit belongs, and the other of the input unit and the output unit of the over delay path or racing path is provided in an area to which the skew detecting unit does not belong;

detecting in the skew detecting unit skew in the over delay path or racing path; and setting in the clock adjusting unit a value of delay based on the skew detected by the skew detecting unit.

* * * * *